US008801016B2

(12) United States Patent
Leonard

(10) Patent No.: US 8,801,016 B2
(45) Date of Patent: Aug. 12, 2014

(54) GAS SPRING PISTON AND GAS SPRING ASSEMBLY INCLUDING SAME

(75) Inventor: Joshua R. Leonard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 13/993,551

(22) PCT Filed: Dec. 19, 2011

(86) PCT No.: PCT/US2011/065811
§ 371 (c)(1),
(2), (4) Date: Jun. 12, 2013

(87) PCT Pub. No.: WO2012/087917
PCT Pub. Date: Jun. 28, 2012

(65) Prior Publication Data
US 2013/0264790 A1 Oct. 10, 2013

Related U.S. Application Data

(60) Provisional application No. 61/425,144, filed on Dec. 20, 2010.

(51) Int. Cl.
*B60G 9/04* (2006.01)
(52) U.S. Cl.
USPC .................................................. 280/124.157

(58) Field of Classification Search
USPC ................... 280/124.157, 124.158, 124.159, 280/124.162, 124.164
See application file for complete search history.

(56) References Cited

U.S. PATENT DOCUMENTS

| | | | |
|---|---|---|---|
| 4,506,910 A * | 3/1985 | Bierens | 280/124.116 |
| 4,858,949 A | 8/1989 | Wallace et al. | |
| 5,707,045 A * | 1/1998 | Easter | 267/64.21 |
| 6,250,613 B1 * | 6/2001 | Koeske et al. | 267/66 |
| 6,312,006 B1 * | 11/2001 | Svensson | 280/683 |
| 6,840,525 B1 * | 1/2005 | Griffiths | 280/124.116 |
| 7,104,561 B1 * | 9/2006 | Griffiths | 280/124.157 |
| 7,942,427 B2 * | 5/2011 | Lloyd | 280/6.157 |
| 8,123,202 B2 * | 2/2012 | Eise et al. | 267/64.21 |
| 8,540,222 B2 * | 9/2013 | Westnedge et al. | 267/64.27 |

FOREIGN PATENT DOCUMENTS

WO WO 2007/104671 9/2007

\* cited by examiner

*Primary Examiner* — Faye M. Fleming
(74) *Attorney, Agent, or Firm* — Jason A. Houser; Fay Sharpe LLP

(57) ABSTRACT

A piston assembly (204) including an integral piston chamber (218) with an increased volume that is maximized by providing a mounting arrangement whereby the piston can be mounted to a structural member (stz) such that the piston chamber (218) surrounds at least two sides of the structural member (stz). The piston chamber (218) can therefore utilize space adjacent the structural member (stz) to which it is mounted thereby resulting in a piston chamber of a greater volume than prior art designs. A gas spring assembly (200) utilizing such a piston is also included.

20 Claims, 17 Drawing Sheets

GAS SPRING PISTON AND GAS SPRING ASSEMBLY INCLUDING SAME

BACKGROUND

The subject matter of the present disclosure broadly relates to the art of fluid suspension systems. It finds particular application in conjunction with gas spring assemblies such as are commonly used in vehicle suspension systems, and will be described herein with particular reference thereto. However, it is to be appreciated that the subject matter of the present disclosure is capable of broad use in a wide variety of applications and environments and that the specific reference herein to use in vehicle suspension systems is merely exemplary.

Vehicle suspension systems typically include a plurality of spring elements for accommodating forces and loads associated with the operation and use of the vehicle. In such vehicle suspension system applications, it is often considered desirable to select spring elements that have the lowest suitable spring rate, as this favorably influences ride quality and comfort. That is, it is well understood in the art that the use of spring elements having higher spring rates (i.e., stiffer springs) will transmit a greater magnitude of road inputs into the sprung mass of the vehicle and that this typically results in a rougher, less-comfortable ride. Whereas, the use of spring elements having lower spring rates (i.e., softer, more-compliant springs) will transmit a lesser amount of the road inputs to the sprung mass and will, thus, provide a more comfortable ride.

With more specific reference to gas springs, it is possible to reduce the spring rate of gas springs, thereby improving ride comfort, by increasing the volume of pressurized gas operatively associated with the gas spring. This is commonly done by placing an additional chamber, cavity or volume filled with pressurized gas into fluid communication with the primary spring chamber of the gas spring, as is well known by those of skill in the art. Such additional volumes can be formed within a component of the gas spring itself, as shown, for example, in U.S. Pat. No. 5,954,316, or provided separately and connected through one or more passages, as shown, for example, in U.S. Pat. No. 6,691,989.

While it is known to increase the volume of the pressurized gas associated with the gas spring by providing external reservoirs or fluidly connecting a piston chamber with the main spring chamber, such approaches include certain disadvantages that may have limited the adoption and use thereof. For example, providing a remote reservoir generally involves mounting a separate reservoir and connecting it to the main spring chamber via a hose or the like. This approach introduces additional potential leak points, and requires additional steps in the manufacturing and/or assembly processes. Providing additional volume by connecting the main spring chamber to a piston chamber can provide suitable results in some applications, but the additional volume that can be added is often limited by mounting constraints. For example, past piston designs generally include a planar mounting surface on the bottom of the piston for mounting the piston to a corresponding planar support member. Given the generally tight spaces in which such pistons are often mounted, the additional volume added to the spring chamber is often limited to the volume of the piston chamber that is located above the mounting surface.

Accordingly, it is believed desirable to develop a gas spring piston as well as a gas spring assembly and vehicle suspension system that include such a gas spring piston that obviate the foregoing and/or other disadvantages of known constructions.

BRIEF DESCRIPTION

One example of a gas spring piston assembly in accordance with the subject matter of the present disclosure can include an integral piston chamber with an increased volume, such as by including a piston with a mounting arrangement that permits the piston to be mounted on or along an associated structural member such that the piston chamber surrounds at least two sides of the associated structural member. The piston chamber can therefore utilize space adjacent (e.g., beside and/or below) the associated structural member to which the gas spring piston is mounted. As a result, an internal piston chamber having a greater volume than conventional designs can be achieved.

One example of a gas spring assembly in accordance with the subject matter of the present disclosure can include an end member adapted to be mounted to a first associated support structure, a gas spring piston assembly adapted to be mounted to a second associated support structure spaced from the first associated support structure, and a flexible sleeve extending between and sealingly connected to the end member and the gas spring piston assembly. The flexible sleeve can at least partially form a main chamber between the end member and the gas spring piston assembly for containing a pressurized gas. The piston assembly can include a shell and a mounting surface. The shell can include a piston profile portion having an exterior surface over which the flexible sleeve is configured to roll. The shell can generally define a piston chamber for containing a pressurized gas. The mounting surface can be adapted for mounting the piston to the second associated support structure. The mounting surface can be recessed into the shell such that the piston chamber extends through a mounting plane of the piston defined by the mounting surface. When the piston assembly is mounted on or along the second associated support structure, the piston chamber can at least partially surround the second associated support structure on at least two sides thereof.

In one example, the shell can include a generally cylindrical upper portion and a generally toroidal-shaped lower portion. The mounting surface can be recessed into the toroidal lower portion of the shell. The toroidal lower portion can be configured to surround the mounting surface such that the piston chamber can at least partially surround the second associated support structure by extending on or along at least four sides thereof when the piston assembly is mounted to the second associated support structure. The piston chamber can include an upper chamber portion and a lower reservoir extension. The reservoir extension can be configured to extend parallel to a linear edge of the second mounting member. The recessed mounting surface can be located in a U-shaped recess in the shell.

In some cases, the gas spring assembly can be part of a vehicle suspension system. The vehicle suspension system can include first and second support structures that are disposed in spaced relation to one another. The gas spring assembly can be secured between the first and second support structures.

Another example of a gas spring assembly in accordance with the subject matter of the present disclosure can include an end member adapted to be mounted to a first associated support structure and a piston assembly adapted to be mounted to a second associated support structure that is spaced from the first support structure. A flexible sleeve can extend between and sealingly connected to the end member and the piston assembly, and thereby form a main chamber therebetween for containing a pressurized gas. The piston assembly can include a shell having a piston profile portion that includes an exterior surface over which the flexible sleeve is configured to roll. The piston profile portion can generally define a piston chamber for containing a pressurized gas. The shell can further include a reservoir portion that is rigidly interconnected with the piston chamber such that the interior volumes of each respective portion are in fluid communication with one another. The piston assembly can also include a mounting surface adapted for mounting the piston assembly on or along the second support structure. The mounting surface can be recessed into the shell and can define a mounting plane. The piston profile portion can extend in a first direction from the mounting plane and the reservoir portion can extend in a second direction from the mounting plane. As such, the piston profile portion can be located on a first side of the second support structure and the piston reservoir portion can be located on a second side of the second support structure when the piston assembly is mounted on or along the second support structure.

In some cases, the reservoir portion can be generally U-shaped reservoir portion in cross-section. Additionally, in some cases, the mounting surface can be located in the bottom of the U-shaped reservoir portion such that the piston reservoir straddles the support member when the piston assembly is mounted on or along the support member. In other cases, the reservoir portion can have a shape corresponding to the shape of the second support structure such that the reservoir surrounds the second support structure on or along at least two sides thereof when the piston assembly is mounted on or along the second support structure. In some cases, the piston chamber can include a generally cylindrical upper portion and the reservoir portion can have a generally toroidal shape. In some cases, the mounting surface can be recessed into the reservoir portion. In further cases, the reservoir portion can be configured to surround an end of the second support structure such that the piston chamber at least partially surrounds the second support structure on or along at least four sides when the piston assembly is mounted on or along the second support structure. Additionally, the shell can include a generally cylindrical upper portion and the reservoir portion can be configured to extend parallel to a linear edge of the second mounting member. The mounting surface can be located in a U-shape recess in the shell.

A further example of a gas spring piston for a gas spring assembly can include a shell and a mounting surface. The shell can include a piston profile portion having an exterior surface over which an associated flexible sleeve can be configured to roll. The shell can generally define a piston chamber for containing a pressurized gas. The mounting surface can be adapted for mounting the piston to an associated support member. The mounting surface can be recessed into the shell such that the piston chamber extends through a mounting plane of the gas spring piston that is at least partially defined by the mounting surface. In such case, the piston chamber can at least partially surround the associated support member on or along at least two sides thereof when the gas spring piston is mounted on or along the associated support member. Optionally, the piston chamber can include a generally cylindrical upper portion and a generally toroidal lower portion. In some cases, the mounting surface can be recessed into the toroidal lower portion of the piston chamber, and the toroidal lower portion can be configured to surround an end of the mounting surface. In such case, the piston chamber can at least partially surround the associated support member on or along at least four sides thereof when the gas spring piston is mounted on or along the associated support structure.

DETAILED DESCRIPTION

Figure 1:
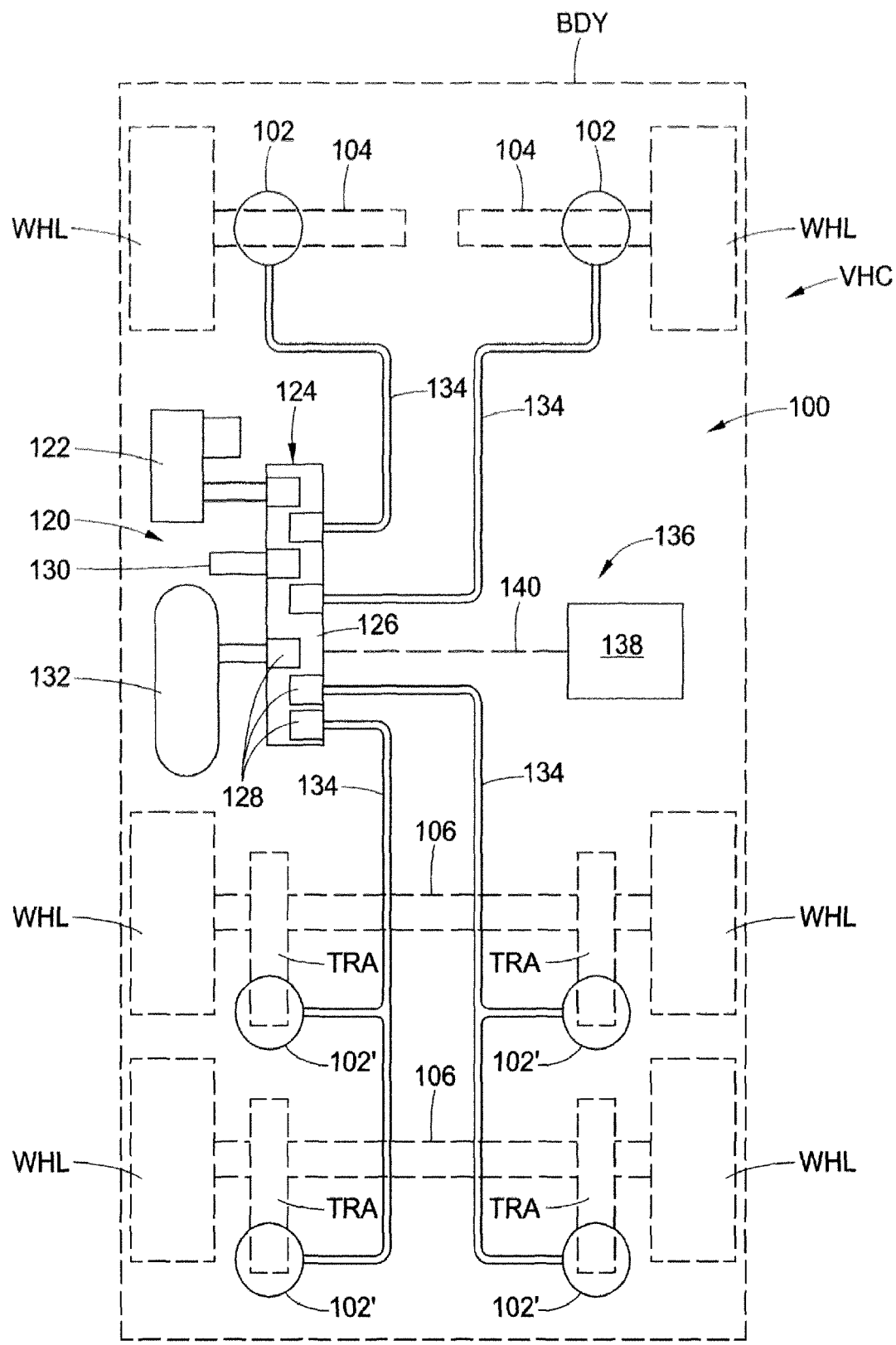
FIG. 1 is a schematic representation of one example of a vehicle including a suspension system and gas spring assemblies in accordance with the subject matter of the present disclosure.

Turning now to the drawings, wherein the showings are for the purpose of illustrating examples of the subject matter of the present disclosure and which are not intended as a limitation of the same, FIG. 1 illustrates one example of a suspension system 100 disposed between a sprung mass, such as an associated vehicle body BDY, for example, and an unsprung mass, such as an associated wheel WHL or an associated wheel-engaging member or axle, for example, of an associated vehicle VHC. It will be appreciated that any such suspension system can include any number of one or more systems, components and/or devices and that the same can be operatively connected between the sprung and unsprung masses of the associated vehicle in any suitable manner. For example, such a suspension system can include a plurality of damping members (not shown), which can be operatively connected between the sprung and unsprung masses of the associated vehicle in any suitable manner.

Additionally, or in the alternative, such a suspension system can include a plurality of gas spring assemblies that are supported between the sprung and unsprung masses of associated vehicle VHC. In the embodiment shown in FIG. 1, suspension system 100 includes six gas spring assemblies 102, 102', one or more of which is disposed toward each corner of the associated vehicle adjacent a corresponding wheel WHL thereof. However, it will be appreciated that any other suitable number of gas spring assemblies 102, 102' could alternately be used and that such gas spring assemblies can be disposed in any other suitable configuration and/or arrangement. It will be recognized that gas spring assemblies 102 are operatively associated with a front axle 104 of vehicle VHC, while gas spring assemblies 102' are operatively associated with respective rear axles 106 of vehicle VHC. As will be appreciated, gas spring assemblies 102 are shown as being mounted between axle 104 and vehicle body BDY, whereas each of gas spring assemblies 102' are shown as being mounted between respective trailing arms TRA and vehicle body BDY.

Suspension system 100 can also optionally include a pressurized gas system 120 that is operatively associated with the gas spring assemblies for selectively supplying pressurized gas (e.g., air) thereto and selectively transferring pressurized gas therefrom. In the exemplary embodiment shown in FIG. 1, pressurized gas system 120 includes a pressurized gas source, such as a compressor 122, for example, for generating pressurized air or other gases. The gas supply system can also include any number of one or more control devices of any suitable type, kind and/or construction that may be capable of performing the selective transfer of pressurized gas. For example, a valve assembly 124 is shown as being in communication with compressor 122 and can be of any suitable configuration or arrangement. In the exemplary embodiment shown, valve assembly 124 includes a valve block 126 with a plurality of valves 128 supported thereon. Valve assembly 124 can also optionally include a suitable exhaust, such as a muffler 130, for example, for venting pressurized gas from the system. Optionally, pressurized gas supply system 120 can also include a reservoir 132 in fluid communication with valve assembly 124 and suitable for storing pressurized gas.

The one or more control devices, such as valve assembly 124, for example, can be in communication with gas spring assemblies 102 and 102' in any suitable manner, such as, for example, through suitable fluid transmission lines 134. As such, pressurized gas can be selectively transmitted to and/or from the gas springs through valve assembly 124, such as to alter or maintain vehicle height at one or more corners of the vehicle, for example.

Suspension system 100 also includes a control system 136 that is capable of communication with any one or more other systems and/or components (not shown) of suspension system 100 and/or of VHC, and is capable of selective operation and control of the suspension system. Control system 136 includes a controller or electronic control unit (ECU) 138 in communication with compressor 122 and/or valve assembly 124, such as through a suitable conductor or lead 140, for example, for selective operation and control thereof, including supplying and exhausting pressurized fluid to and from any number of one or more gas spring assemblies, such as gas spring assemblies 102 and/or 102', for example. Additionally, it will be appreciated that controller 138 can be of any suitable type, kind and/or configuration.

Control system 136 can also optionally include one or more height or distance sensing devices (not shown) as well as any other desired systems and/or components. Such height sensors, if provided, are preferably capable of generating or otherwise outputting a signal having a relation to a height or distance, such as between spaced components of the vehicle, for example. It will be appreciated that any such optional height sensors or any other distance-determining devices, if provided, can be of any suitable type, kind, construction and/or configuration, such as mechanical linkage sensors, ultrasonic wave sensors or electromagnetic wave sensors, such as may operate using ultrasonic or electromagnetic waves, for example.

Figure 2:
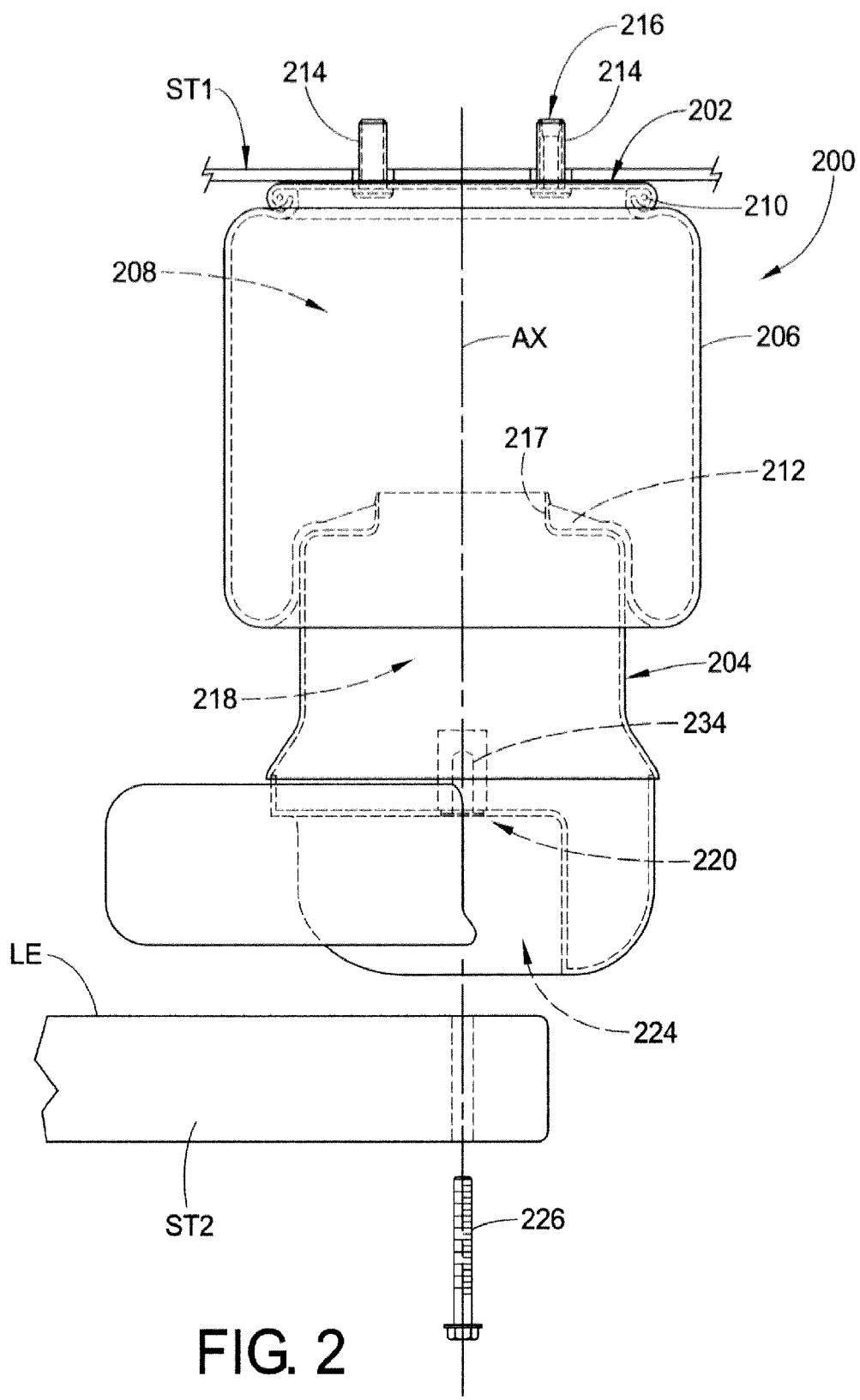
FIG. 2 is a side view of one example of a gas spring assembly in accordance with the subject matter of the present disclosure.
Figure 3:
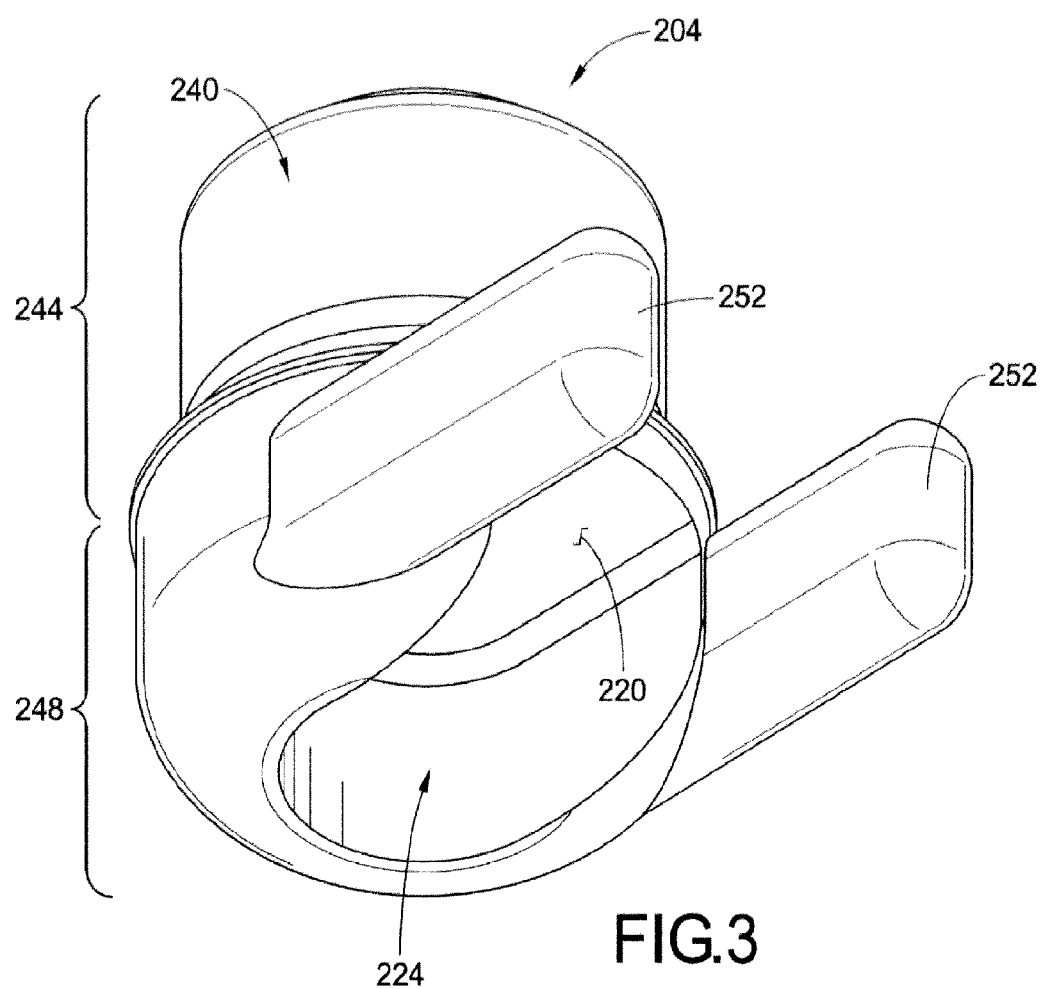
FIG. 3 is a bottom perspective view of the gas spring piston assembly in FIG. 2.
Figure 4:
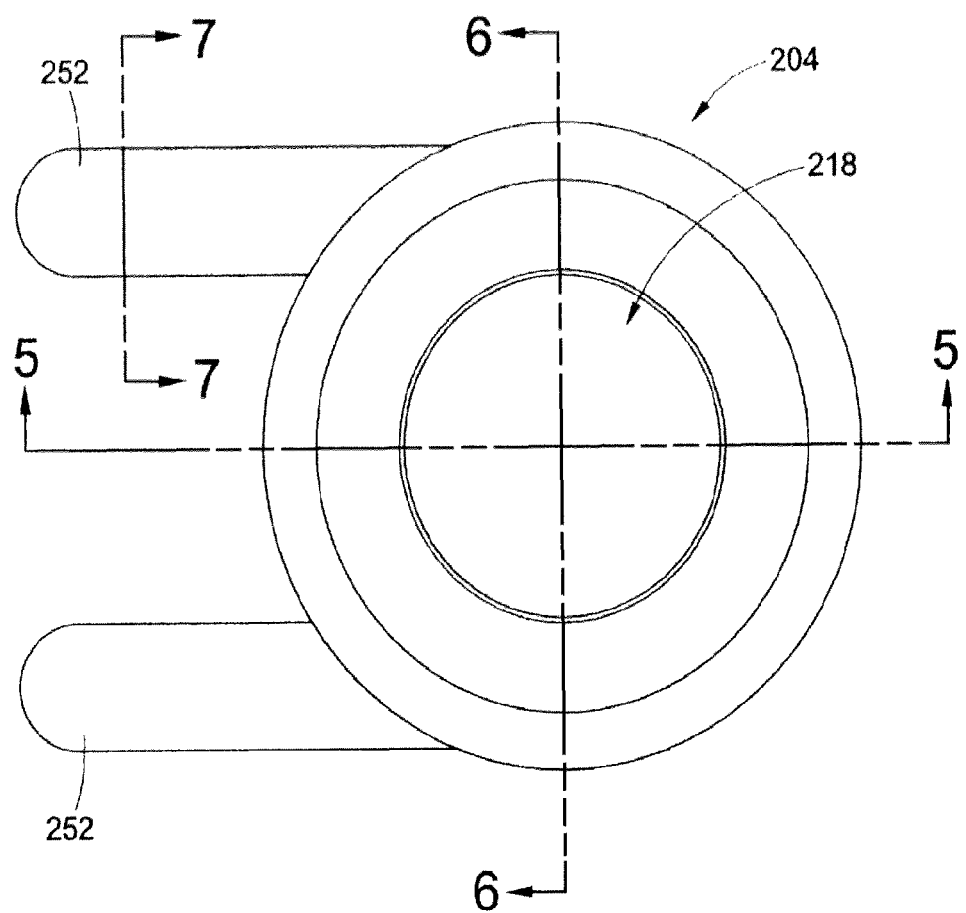
FIG. 4 is a top plan view of the exemplary gas spring piston assembly shown in FIGS. 2 and 3.

Having described an example of a suspension system (e.g., suspension system 100) that can include a gas spring assembly in accordance with the subject matter of the present disclosure, one example of such a gas spring assembly will now be described in connection with FIGS. 2-7. Referring initially to FIG. 2, a gas spring assembly 200, such as may be suitable for use as gas spring assembly 102' in FIG. 1, for example, is shown as including a first end member, such as top or bead plate 202, for example, and a second end member, such as piston assembly 204, for example, that is spaced from the first end member. A flexible wall, such as a flexible sleeve 206, for example, is secured between bead plate 202 and piston assembly 204 and at least partially forms a spring chamber 208 therebetween. Flexible sleeve 206 includes an upper mounting bead 210 and a lower mounting bead 212 formed on opposing ends thereof.

Upper mounting bead 210 of the flexible sleeve 206 is captured by the peripheral edge of bead plate 202. The peripheral edge can be deformed around the upper mounting bead in any manner suitable for forming a substantially fluid-tight seal therewith. One or more securement devices, such as mounting studs 214, for example, can be included along bead plate 202. In the exemplary embodiment shown in FIG. 2, mounting studs 214 project outwardly from the bead plate 202 and are secured thereon in a suitable manner. The one or more securement devices are suitable for securing the bead plate 202 on an associated structural component or member ST1, such as a component of a vehicle, for example. A fluid communication port, such as a fluid passage 216, for example, is provided to permit fluid communication with a spring chamber 208. In the exemplary embodiment shown, fluid passage 216 extends through at least one of studs 214 and is in fluid communication with spring chamber 208. However, it will be appreciated that any other suitable fluid communication arrangement could alternately be used.

Although not illustrated in FIG. 2, the lower mounting bead of the flexible sleeve could be captured between an end closure and the piston assembly in a conventional manner, and the end closure could be secured on the piston assembly using a suitable securement device or assembly, such as a mounting stud and nut, for example. Alternately, piston assembly 204 could include a bead mounting wall 217 adapted to receive and retain lower mounting bead 212, such as is shown in FIG. 2, for example.

Piston assembly 204 includes piston chamber 218 defined at least in part by the interior volume of the piston assembly 204. A mounting surface 220 is provided in a recess 224 for mounting piston assembly 204 to an associated structural component or member ST2, which may be a trailing arm or axle tube, for example. A fastener, such as bolt 226, can be provided for cooperating with a threaded bore 234 in mounting surface 220 for securing piston assembly 204 on or along an associated structural component or member, such as, associated structural member ST2 having an elongated linear edge LE, for example. Of course, other fastening arrangements could alternately be employed.

Turning to FIGS. 3-7, piston assembly 204 is shown in greater detail and is identified as including a shell 240 defining a piston profile portion 244 and a reservoir portion 248. In this embodiment, reservoir portion 248 has an at least partially toroidal shape and is also shown as including a pair of auxiliary reservoir extensions 252 protruding therefrom. Auxiliary reservoir extensions 252 are optional and can be configured to provide additional chamber volume as desired. The interior surface of shell 240 at least partially defines piston chamber 218 (see FIG. 5), with the respective interior volumes of piston profile portion 244 and reservoir portion 248 being rigidly interconnected. As used in this description, terms such as "piston chamber" and the like refer to the total volume of the interconnected regions defined within shell 240, which can include but are not limited to the volume within piston profile portion 244, the volume within reservoir portion 248, and other interconnected volumes (e.g., an auxiliary reservoir extension).

Piston profile portion 244 has an exterior surface over which flexible sleeve 206 is configured to roll in conventional fashion when assembled as a gas spring assembly. Mounting surface 220 is provided in recess 224 in shell 240 and defines a mounting plane MP (best seen in FIG. 6) through which at least a portion of piston chamber 218 extends. In other words, in this exemplary embodiment, the piston chamber extends above and below mounting surface 220. As will be appreciated, this feature allows piston chamber 218 to straddle the associated structural component (e.g., associated structural member ST2) when mounted thereto, thereby utilize space adjacent to the associated structural member for increasing the volume of the piston chamber and enhancing the performance of the gas spring assembly.

As will be appreciated, the overall shape of shell 240 is exemplary in nature, and other shapes can be employed without departing from the scope of the disclosure. It will also be appreciated that shell 240 can be a single unitary piece or can be made from two or more pieces joined together, such as by welding, for example. Shell 240 can be formed from any suitable material or combination of materials, such as plastic, steel, carbon fiber, etc.

Figure 5:
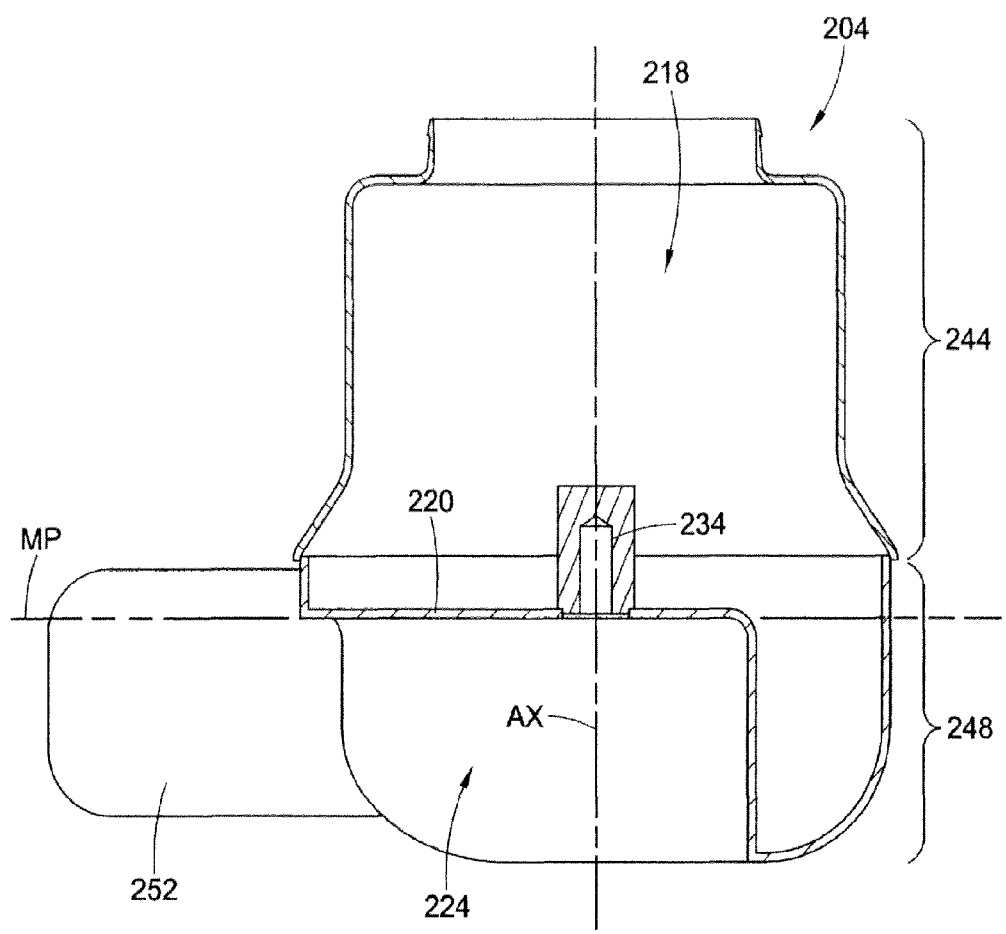
FIG. 5 is a cross-sectional side view of the exemplary gas pring piston assembly in FIGS. 2-4 taken from along line 5-5 in FIG. 4.
Figure 6:
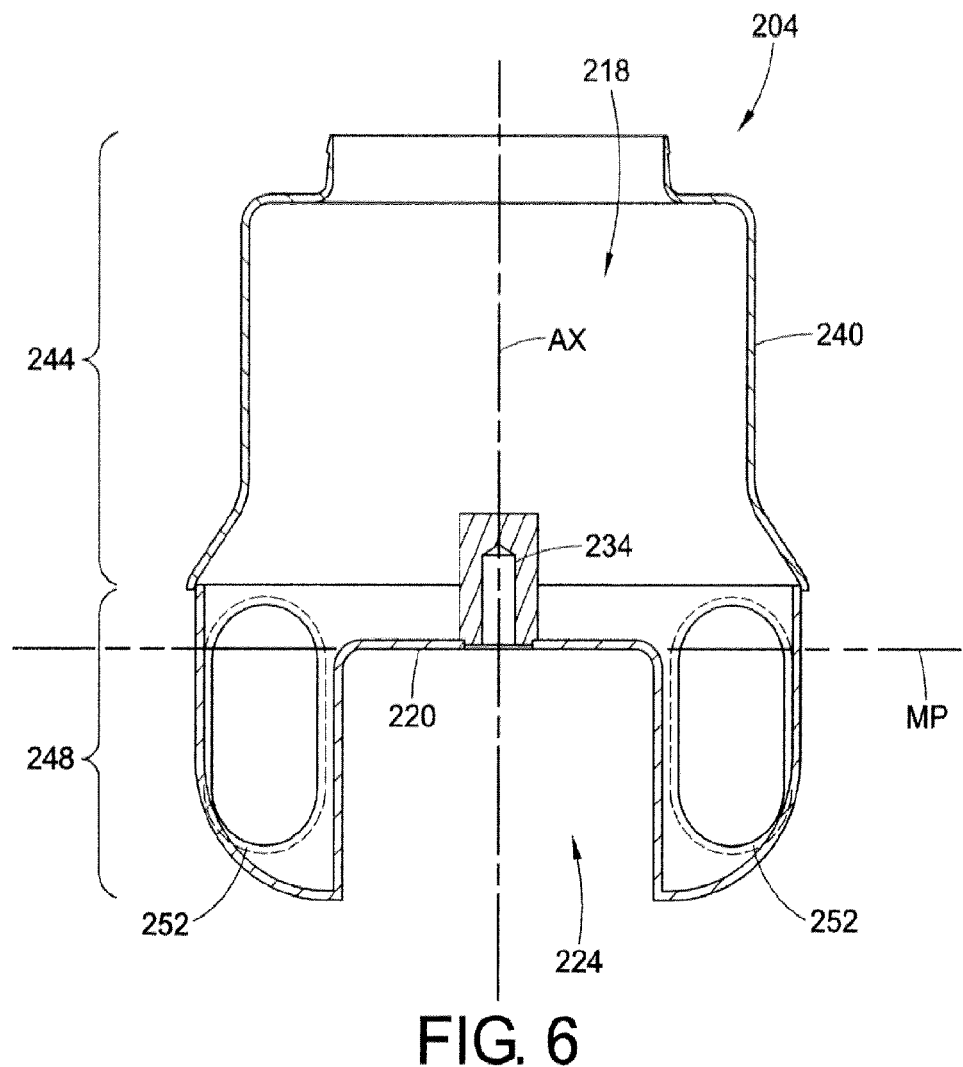
FIG. 6 is a cross-sectional side view of the exemplary gas spring piston assembly in FIGS. 2-5 taken from along line 6-6 in FIG. 4.
Figure 7:
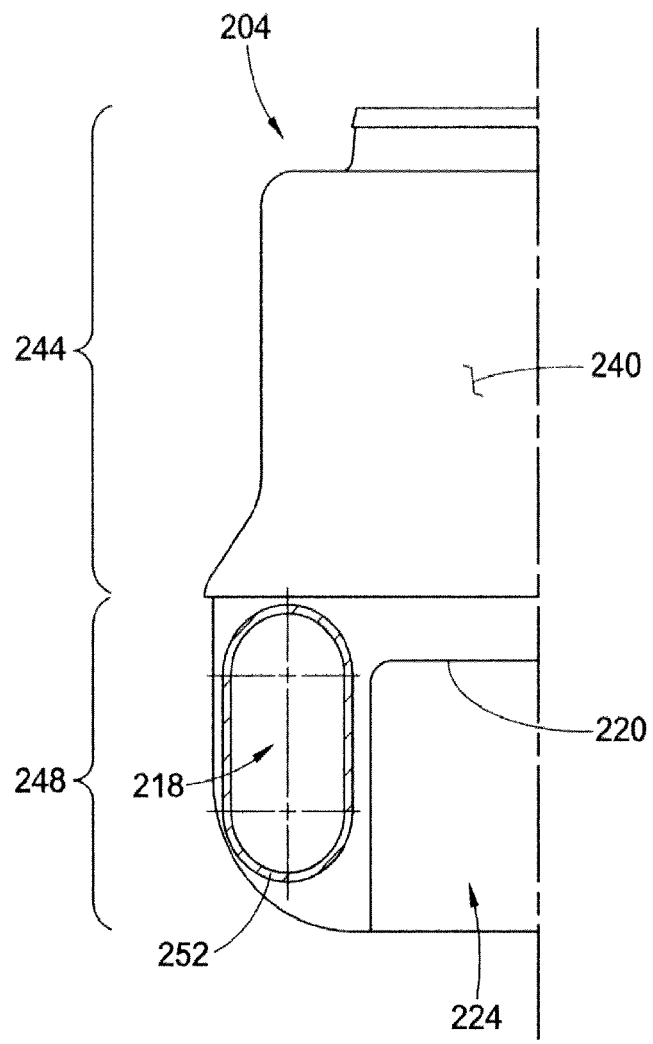
FIG. 7 is a cross-sectional side view of a portion of the exemplary gas spring piston assembly in FIGS. 2-6 taken from along line 7-7 in FIG. 4.
Figure 8:
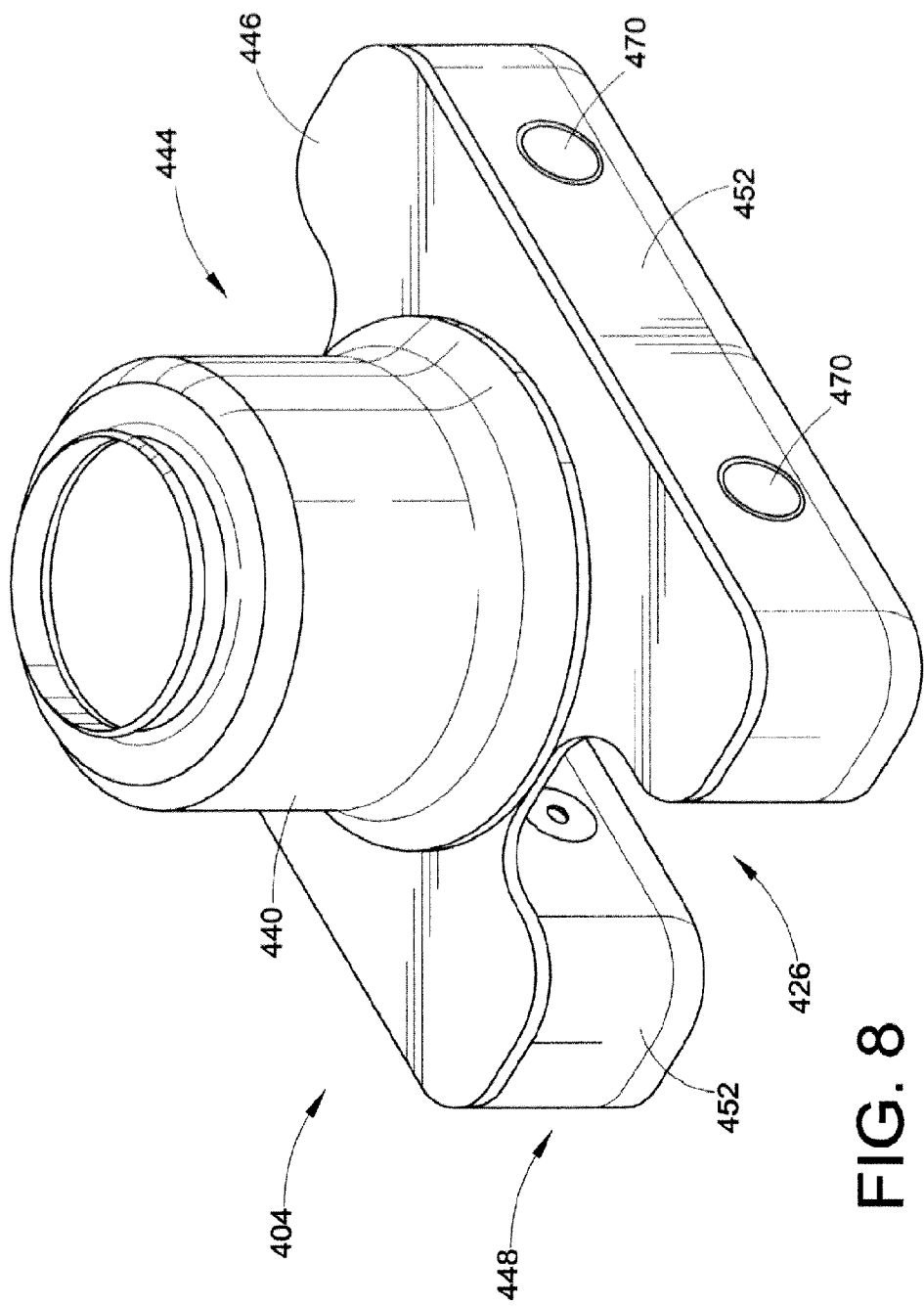
FIG. 8 is a top perspective view of another example of a gas spring piston assembly in accordance with the subject matter of the present disclosure.
Figure 9:
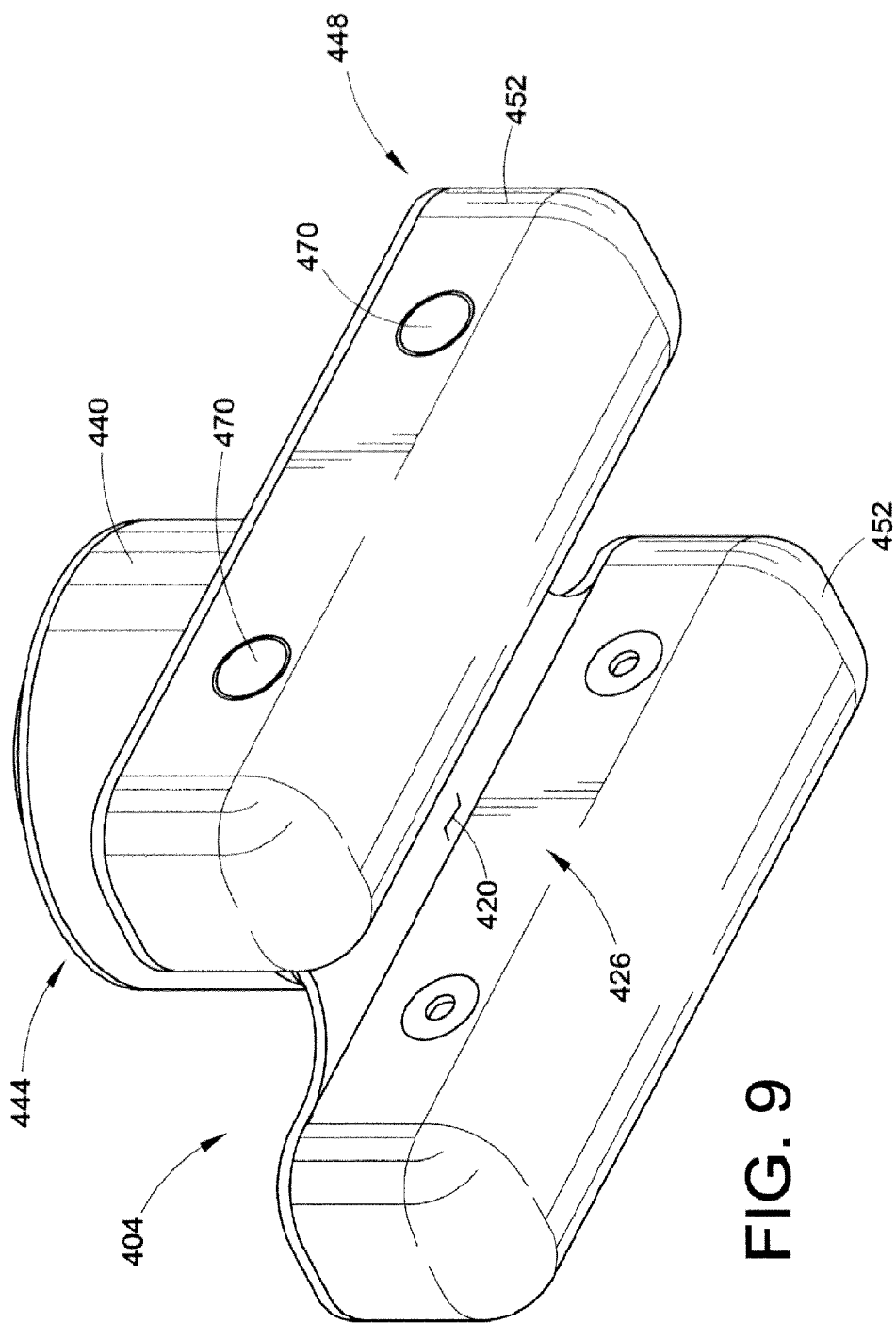
FIG. 9 is a bottom perspective view of the exemplary gas spring piston assembly in FIG. 8.
Figure 10:
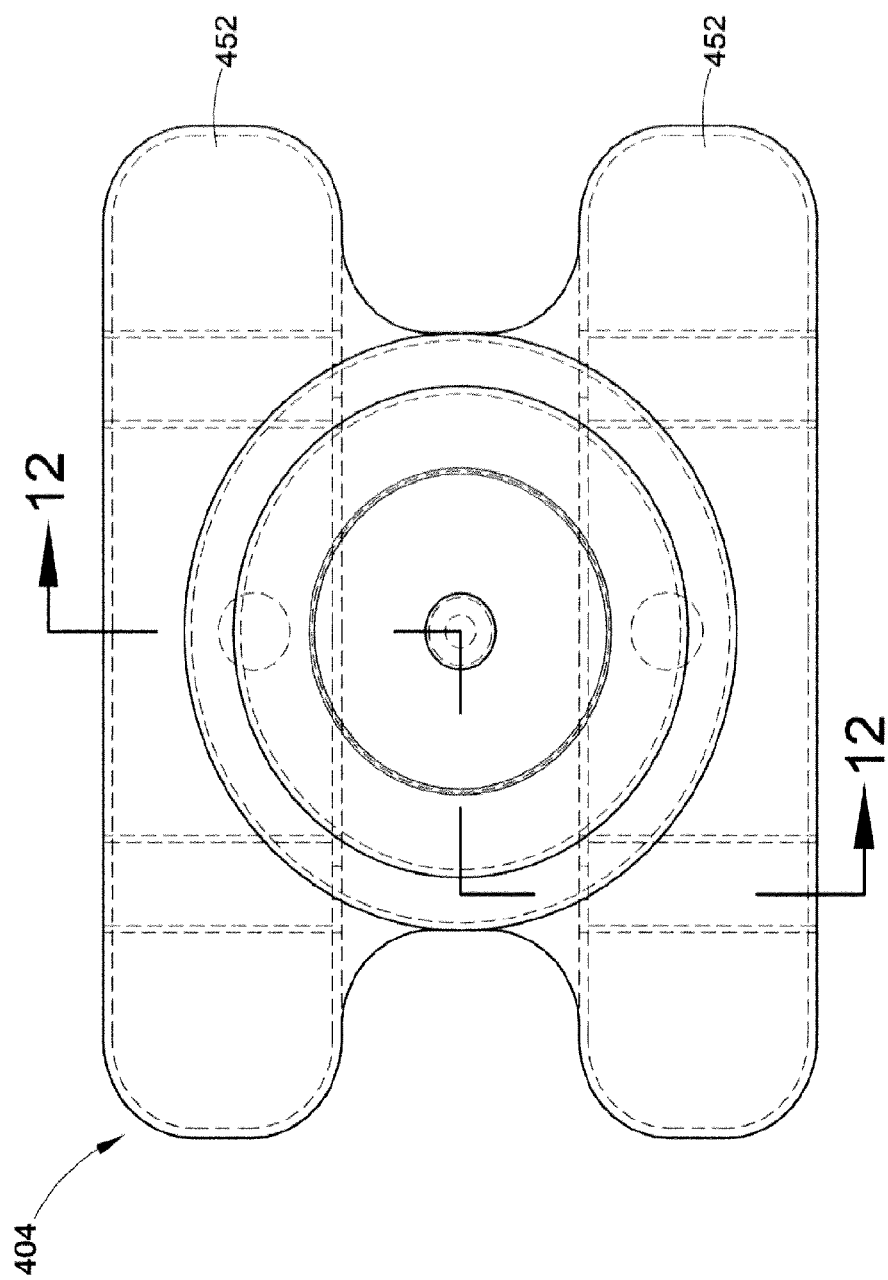
FIG. 10 is a top plan view of the exemplary gas spring piston assembly in FIGS. 8 and 9.
Figure 11:
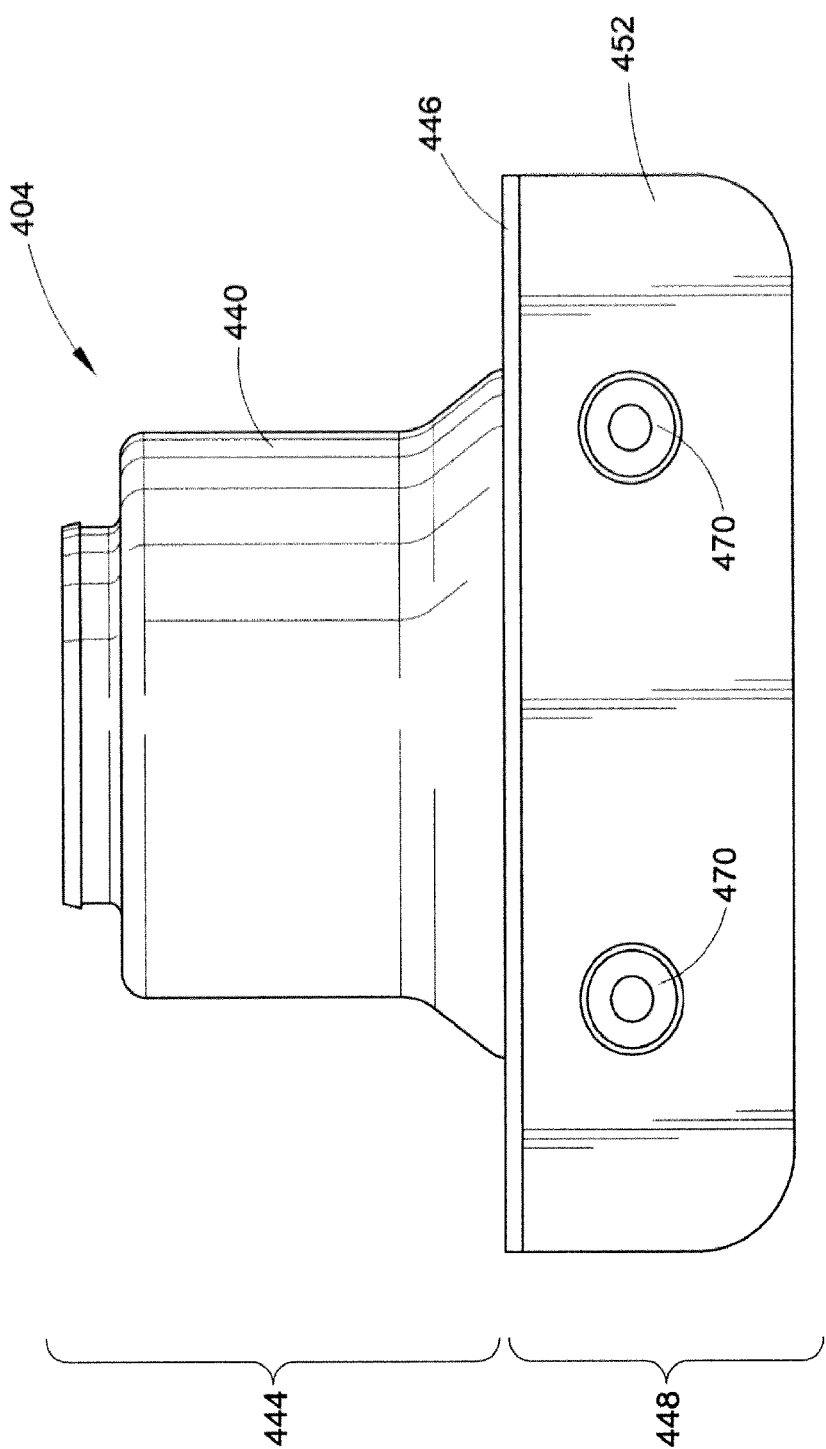
FIG. 11 is a side elevation view of the exemplary gas spring piston assembly in FIGS. 8-10.
Figure 12:
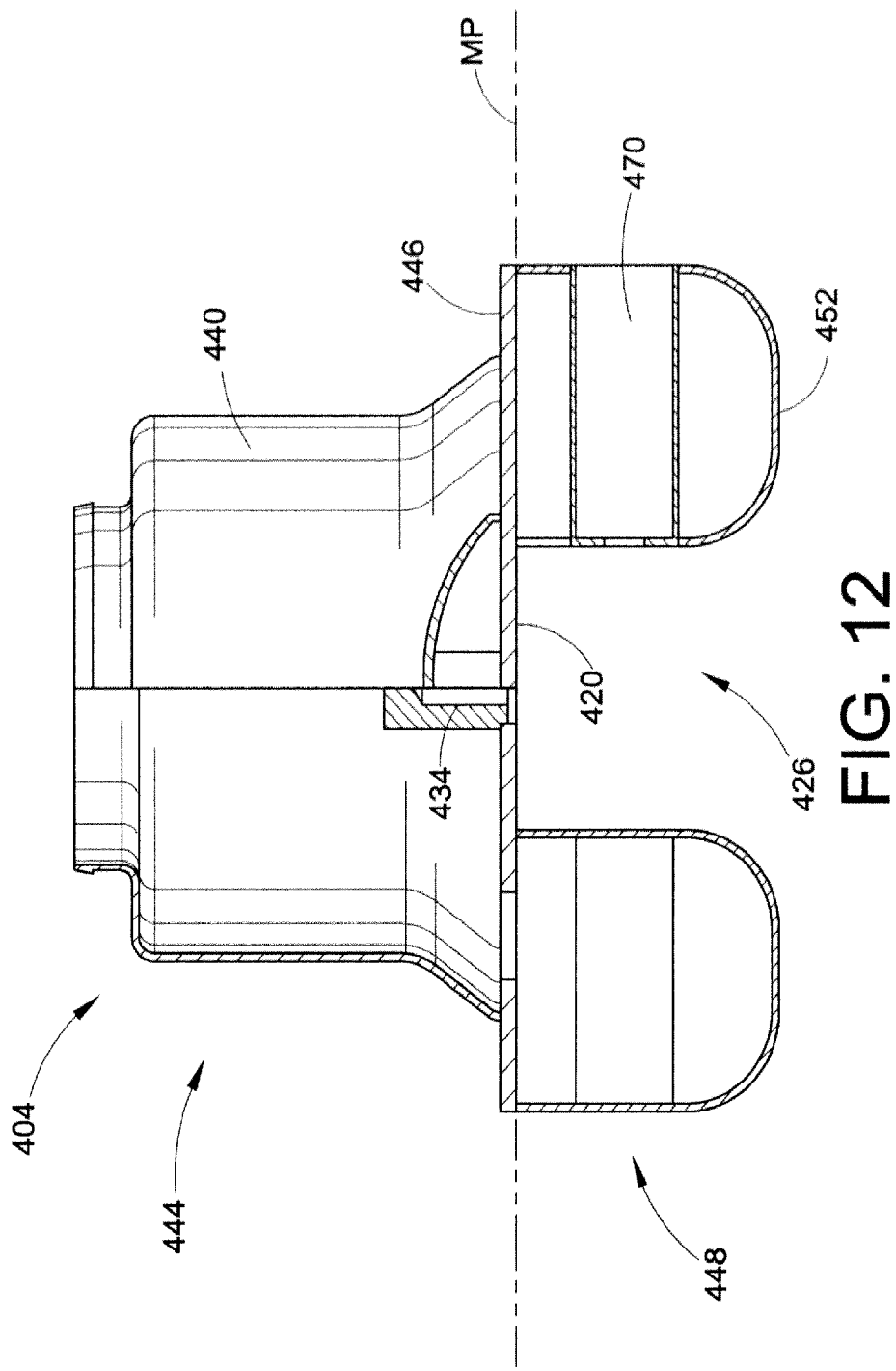
FIG. 12 is a cross-sectional side view of the exemplary gas spring piston assembly in FIGS. 8-11 taken from along line 12-12 in FIG. 10.
Figure 13:
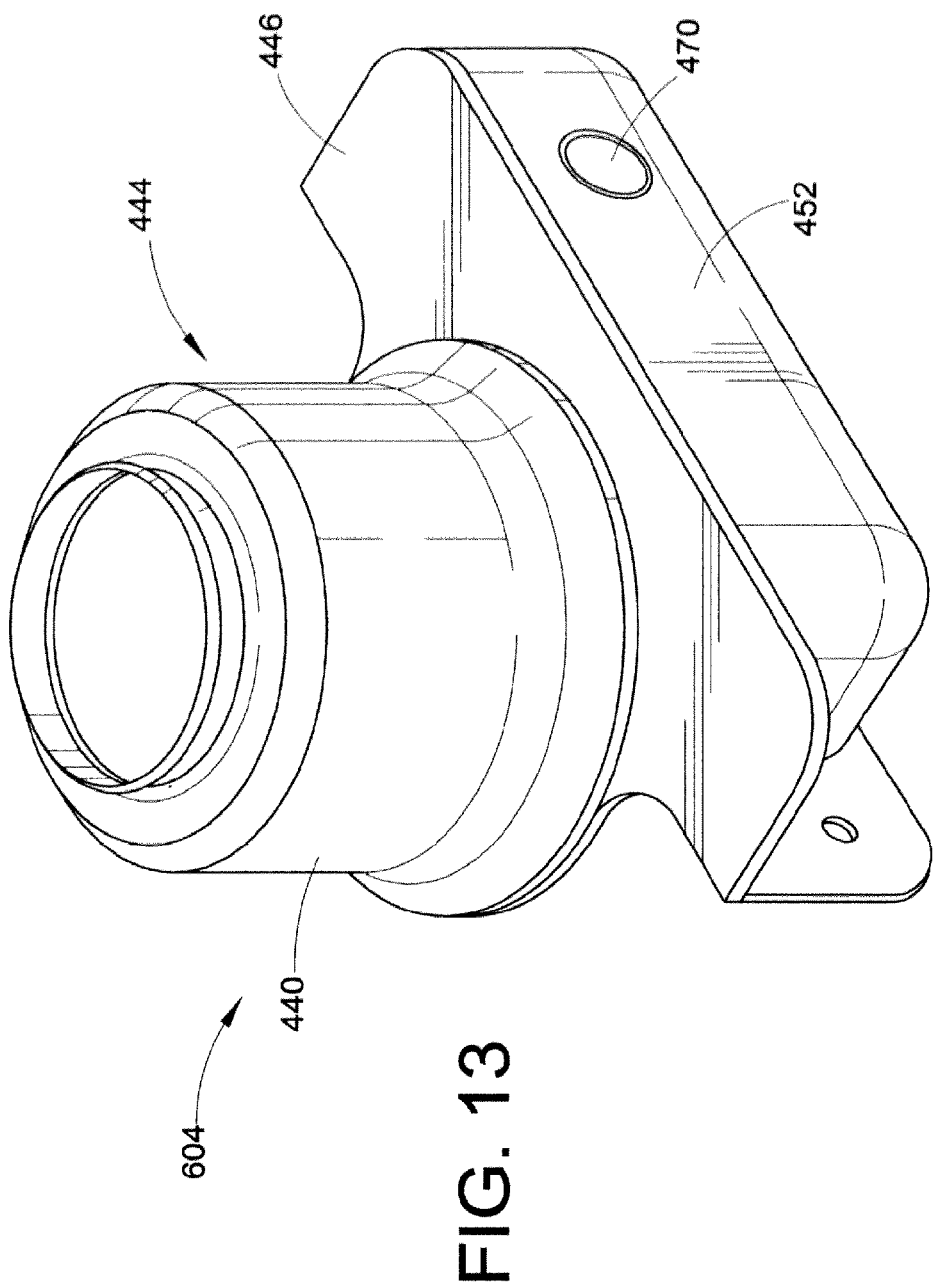
FIG. 13 is a top perspective view of a further example of a gas spring piston assembly in accordance with the subject matter of the present disclosure.
Figure 14:
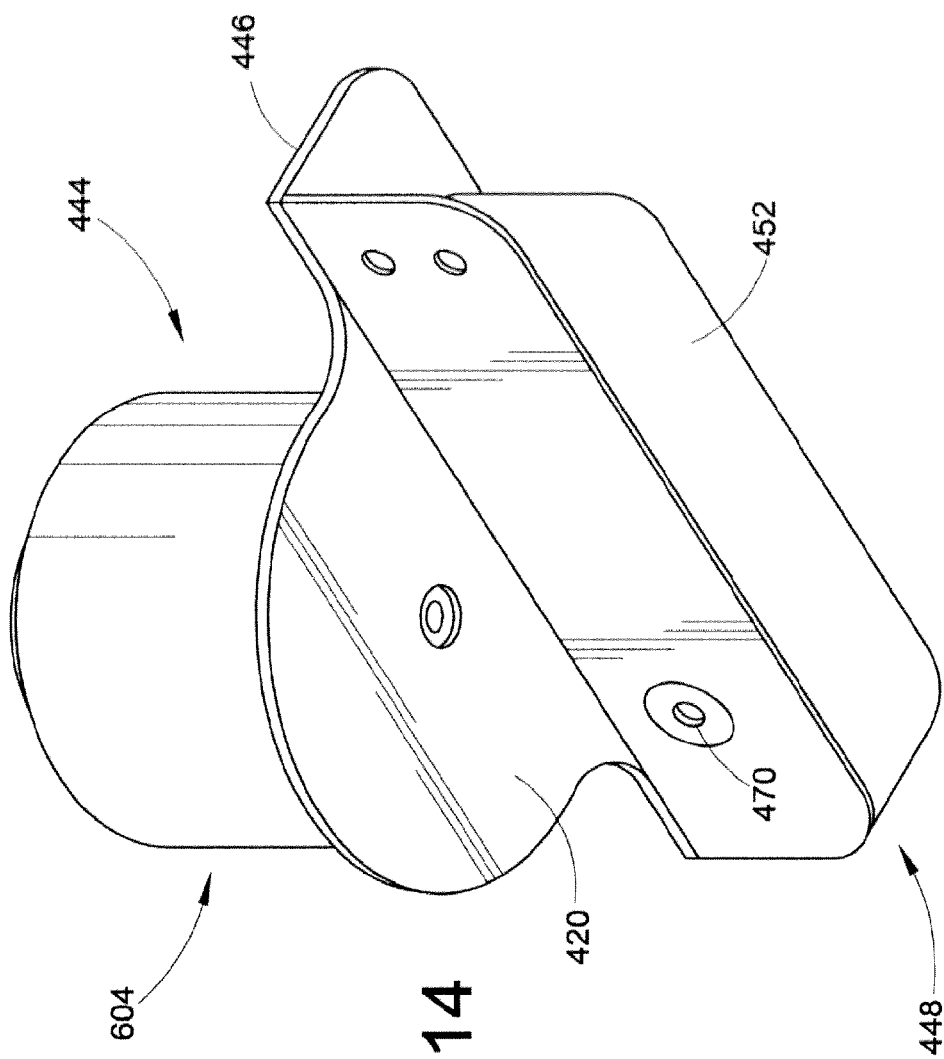
FIG. 14 is a bottom perspective view of the exemplary gas spring piston assembly in FIG. 13.
Figure 15:
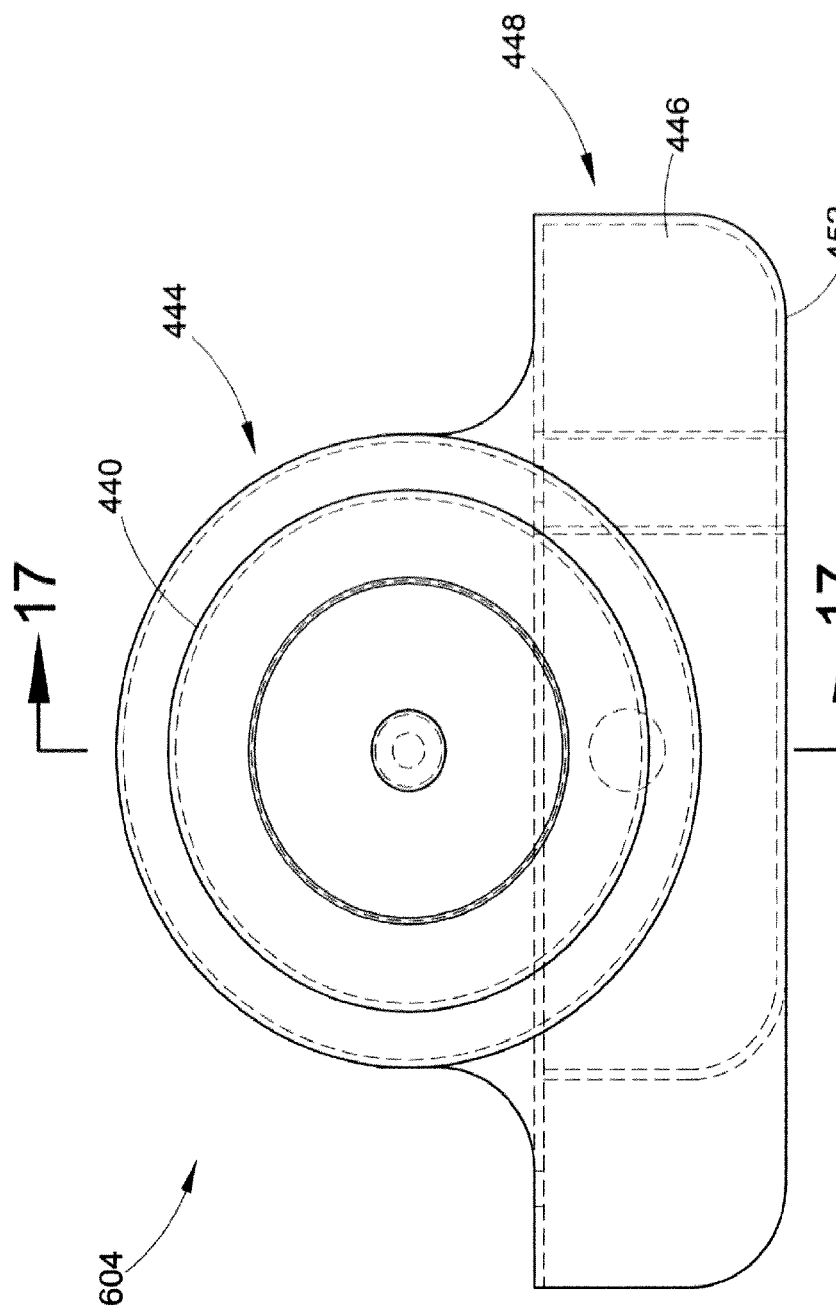
FIG. 15 is a top plan view of the exemplary gas spring piston assembly in FIGS. 13 and 14.
Figure 16:
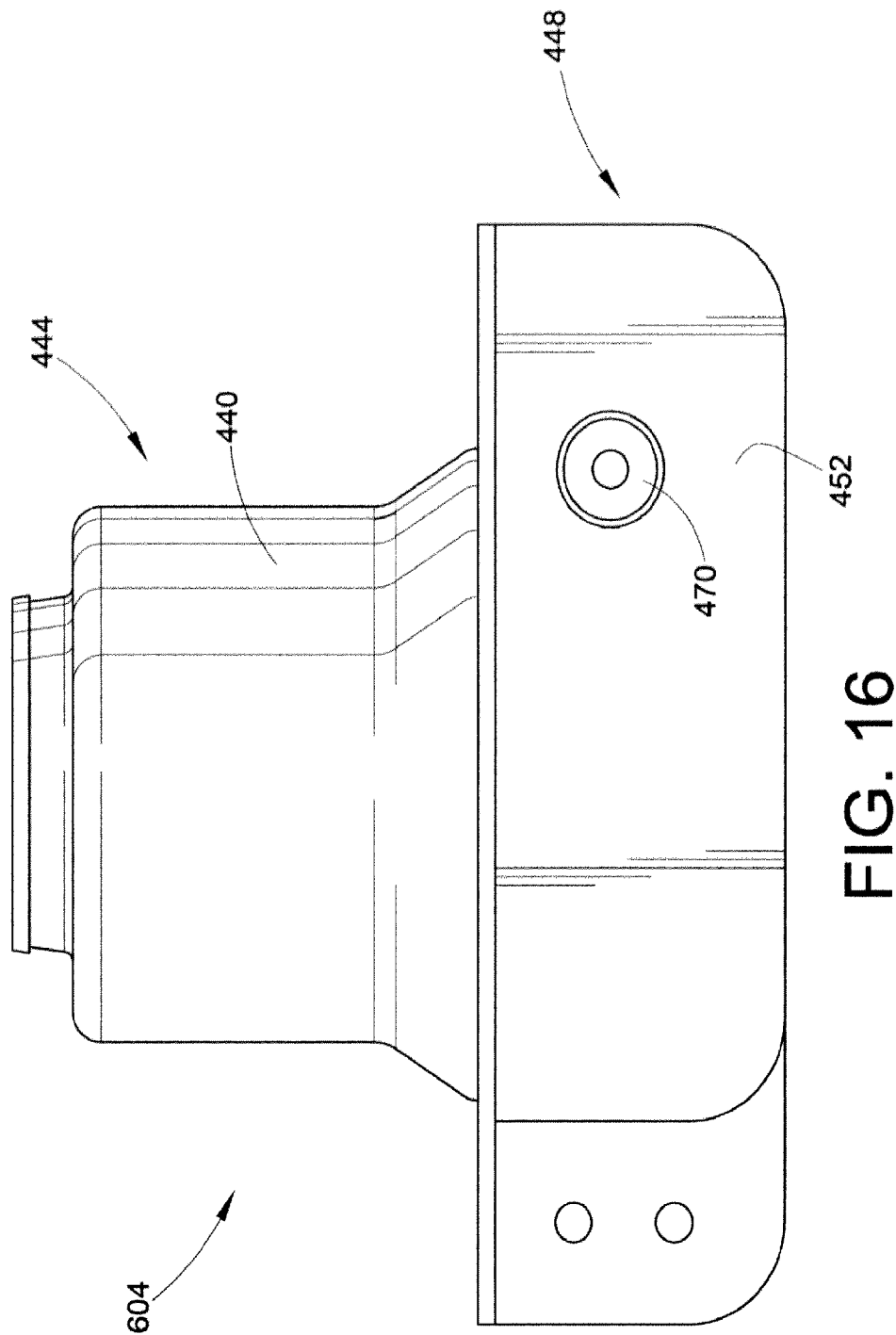
FIG. 16 is a side elevation view of the exemplary gas spring piston assembly in FIGS. 13-15.
Figure 17:
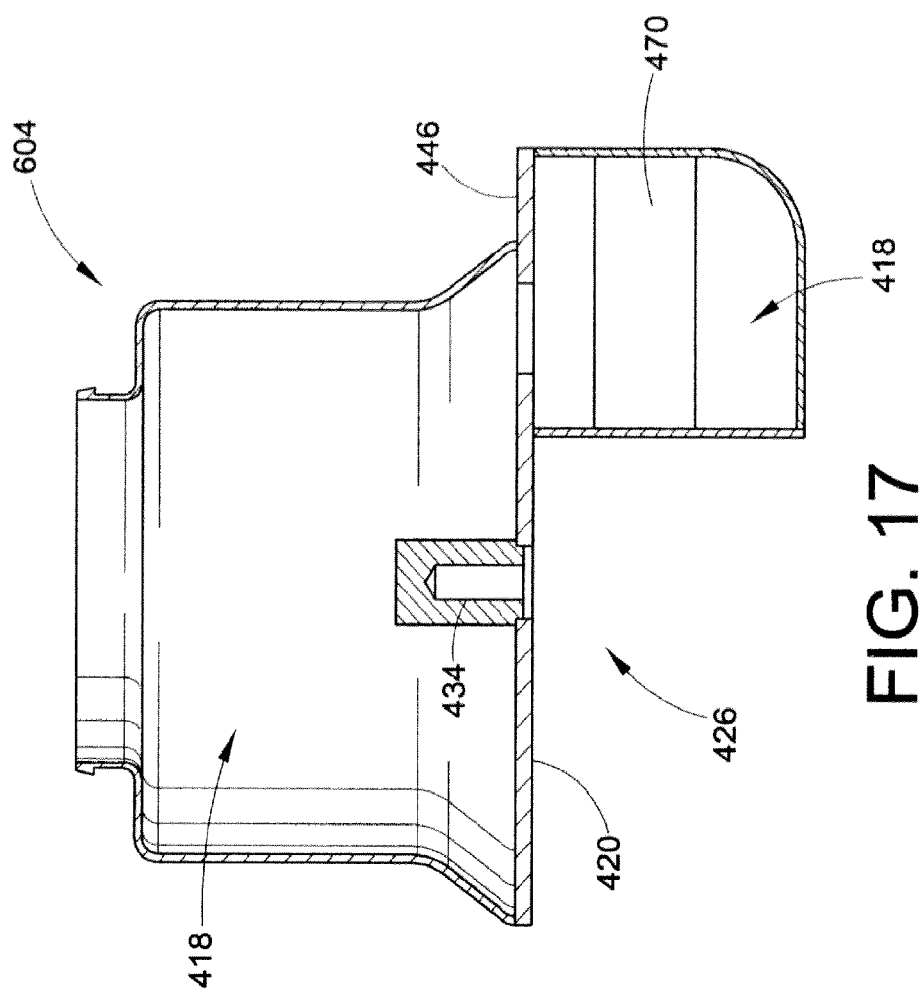
FIG. 17 is a cross-sectional side view of the exemplary gas spring piston assembly in FIGS. 13-16 taken from along line 17-17 in FIG. 15.

As best shown in FIGS. 5-7, and especially FIG. 6, recess 224 is generally U-shaped in cross-section and is configured to receive a structural member, such as that illustrated in FIG. 2, for example. Such structural member may be associated with a trailing arm of a suspension system, for example. When mounted to the structural component (e.g., associated structural member ST2), reservoir portion 248 of piston assembly 204 surrounds the associated structural member on at least two sides thereof. In this regard, piston chamber 218 surrounds the end of associated structural component ST2 on four sides (e.g., top, left, right and distal end), with only the bottom of the associated structural member not surrounded by a portion of the piston chamber. Of course, piston assembly 204 could be configured to completely surround the associated structural member if desired or appropriate for a given application. As will be appreciated, the shape of recess 224 can be any desired shape. For example, the recess could be cylindrical for mounting along a corresponding cylindrical structural member, such as an axle tube or the like.

Turning now to FIGS. 8-12, another exemplary piston assembly 404 is illustrated that is suitable for use in forming a gas spring assembly, such as one of gas spring assemblies 102 and/or 102', in FIG. 1, for example. In this embodiment, piston assembly 404 includes a shell 440 forming a piston profile portion 444 extending from a first side of a base plate 446, and includes a lower reservoir portion 448 in the form of a pair of spaced apart reservoir extensions 452 extending from a second side of base plate 446. Reservoir extensions 452 and base plate 446 together define a recess in the form of channel 426. A mounting surface 420 is provided and includes a threaded bore 434 (FIG. 12) configured to receive a bolt (not shown in FIGS. 8-12) for securing the piston assembly 404 to an associated structural component, such as associated structural member ST2 in FIG. 2, for example, in a similar manner to that previously disclosed in connection with FIG. 2. In addition to threaded bore 434 or, in the alternative thereto, bores 470 can be provided through reservoir extensions 452 for passing fasteners for further securing piston assembly 404 to an associated structural component (e.g., associated structural member ST2).

Reservoir extensions 452 are configured to straddle opposing sides of an associated structural component when mounted thereto. Thus, unlike the embodiment of FIGS. 2-7 which is generally mounted to an end of a structural member, piston assembly 452 of the present embodiment can be mounted at a middle portion of a structural member (e.g., between respective ends), or at an end thereof depending on the application. As noted, however, a wide variety of configurations of the piston assembly can be employed to provide a piston assembly with an increased piston reservoir volume for a given application.

Turning to FIGS. 13-17, yet another exemplary configuration of a piston assembly is illustrated that is suitable for forming a gas spring assembly in accordance with the subject matter of the present disclosure, such as one or more of gas spring assemblies 102 and/or 102' in FIG. 1, for example. In this embodiment, piston assembly 604 is similar in most respects to piston assembly 404 of FIGS. 9-12, and like reference numerals denote common features of each embodiment. Piston assembly 604 differs from piston assembly 404 in that the reservoir portion is in the form of a single auxiliary reservoir extension 652. Thus, rather than straddling an associated structural component, such as associated structural member ST2 in FIG. 2, for example, piston assembly 604 is adapted to be mounted along a first surface of the associated structural member with reservoir extension 652 disposed on or along an adjacent side or surface of the associated structural member.

It will now be appreciated that embodiments of the present disclosure provide a gas spring assembly having a piston assembly with an increased piston chamber volume as compared to prior art gas spring assemblies. Such increased volume is achieved at least in part by locating a portion of the piston chamber volume on an opposing side of a mounting surface from the piston profile portion of the piston assembly, such as below a mounting surface of the piston assembly in void space, for example, that is on, along or otherwise adjacent to a structural member to which the piston assembly is to be mounted. As such, a wide variety of shell shapes are envisioned to accommodate a wide variety of applications. As will be appreciated, the void space available adjacent a structural member of a given vehicle will vary from vehicle to vehicle. Thus, aspects of the invention are relevant to designing a piston assembly to utilize such unused space for increasing the volume of the piston chamber. For example, a method of making a gas spring in accordance with the exemplary embodiments of the invention could include detecting void space adjacent a support member of a vehicle, and constructing a piston assembly having a piston chamber adapted to occupy a portion of the detected void space.

It will be appreciated that the gas spring assemblies of the present disclosure can be operatively connected between the sprung and unsprung masses of an associated vehicle in any suitable manner. For example, as shown in FIG. 1 the gas spring assemblies can be operatively connected between wheel-engaging members and a body of a vehicle VHC. It will be appreciated, however, that the configuration of vehicle VHC in FIG. 1 is merely a schematic representation of the structural components of the sprung and unsprung masses of the vehicle. Thus, it will be understood that this schematic representation is provided for purposes of discussion and ease of understanding and is not intended to be in any way limiting.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

Still further, the term mounting surface is intended to include any surface that engages or contacts a surface of another member to which the piston assembly is secured, affixed or otherwise abuttingly engaged.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

The invention claimed is:

1. A gas spring assembly comprising:
an end member adapted to be mounted along a first associated support structure;
a piston assembly adapted to be mounted along a second associated support structure spaced from the first associated support structure; and,
a flexible sleeve extending between and sealingly connected to said end member and said piston assembly, and forming a main chamber therebetween for containing a pressurized gas;
said piston assembly including:
a shell including a piston profile portion thereof having an exterior surface over which said flexible sleeve is configured to roll, said shell generally defining a piston chamber for containing a pressurized gas; and,
a mounting surface dimensioned to mount said piston assembly along the second associated support structure, said mounting surface at least partially defining a mounting plane and being recessed into said shell such that said piston chamber extends through said mounting plane such that said piston chamber at least partially surrounds the second associated support structure on at least two sides when said piston assembly is mounted along the second associated support structure.

2. A gas spring assembly as set forth in claim 1, wherein said shell includes a generally cylindrical upper portion and a generally toroidal-shaped lower portion.

3. A gas spring assembly as set forth in claim 2, wherein said mounting surface is recessed into said toroidal-shaped lower portion of said piston chamber.

4. A gas spring assembly as set forth in claim 2, wherein said toroidal-shaped lower portion is configured to surround said mounting surface such that said piston chamber at least partially surrounds the second associated support structure on at least four sides thereof when said piston assembly is mounted along the second associated support structure.

5. A gas spring assembly as set forth in claim 1, wherein said piston chamber includes an upper chamber portion and a lower reservoir extension, said lower reservoir extension configured to extend parallel to an associated linear edge of the second associated mounting member.

6. A gas spring assembly as set forth in claim 1, wherein said recessed mounting surface is located in a U-shape recess in said shell.

7. A vehicle suspension system comprising:
a first support structure;
a second support structure; and,
a gas spring assembly as set forth in claim 1 mounted to said first and second support structures.

8. A gas spring assembly comprising:
an end member adapted to be mounted to a first associated support structure;
a piston assembly adapted to be mounted to a second associated support structure spaced from the first associated support structure; and,
a flexible sleeve extending between and sealingly connected to said end member and said piston assembly, and forming a main chamber therebetween for containing a pressurized gas;
said piston assembly including:
a shell including a shell wall with a piston profile portion and a reservoir portion, said piston portion having an exterior surface over which said flexible sleeve is configured to roll with at least said piston profile portion of said shell wall generally defining a piston chamber in fluid communication with said main chamber and for containing the pressurized gas, and said reservoir portion rigidly interconnected in fluid communication with said piston chamber for containing the pressurized gas; and, a mounting surface for mounting said piston assembly to the second associated support, said mounting surface being recessed into said shell and defining a mounting plane, said piston profile portion extending in a first direction from said mounting plane and said reservoir portion extending in a second direction from said mounting plane;

said piston assembly dimensioned to be mounted to the associated second support structure such that said piston profile portion can be located on a first side of the second associated support structure and said piston reservoir portion can be located on a second side of the second associated support structure.

9. A gas spring assembly as set forth in claim 8, wherein said piston assembly has a side elevation view and said reservoir portion of said shell wall includes a cross-sectional profile from along said side elevation view that includes a shell wall portion having a generally U-shaped configuration with opposing side wall portions and a bottom wall portion extending between said side wall portions, said bottom wall portion including said mounting surface such that, when mounted to the second associated support structure, said piston reservoir straddles the second associated support structure.

10. A gas spring assembly as set forth in claim 8, wherein said reservoir portion has a shape corresponding to said shape of the second associated support structure such that when mounted to the second associated support structure, said reservoir surrounds the second associated support structure on at least two sides.

11. A gas spring assembly as set forth in claim 8, wherein said shell includes a generally cylindrical upper portion, and wherein said reservoir portion is generally toroidal shape.

12. A gas spring assembly as set forth in claim 8, wherein said mounting surface is recessed into said reservoir portion.

13. A gas spring assembly as set forth in claim 8, wherein said reservoir portion is configured to surround an end of the second associated support structure such that, when mounted to the second associated support structure, said piston chamber at least partially surrounds the second associated support structure on at least four sides thereof.

14. A gas spring assembly as set forth in claim 8, wherein said piston chamber includes a generally cylindrical upper portion, and said reservoir portion is configured to extend parallel to a linear edge of the second associated support structure.

15. A gas spring assembly as set forth in claim 8, wherein said mounting surface is located in a U-shape recess in said shell.

16. A vehicle suspension system comprising:
a first support member;
a second support member; and,
a gas spring assembly as set forth in claim 8 mounted to said first and second support members.

17. A piston assembly for a gas spring, said piston assembly comprising:
a shell including a shell wall with a piston profile portion thereof having an exterior surface over which an associated flexible sleeve can be configured to roll, said shell wall generally defining a piston chamber for containing a pressurized fluid; and, a mounting surface for mounting said piston assembly to an associated support member, said mounting surface being recessed into said shell such that said piston chamber extends through a mounting plane of said piston defined by said mounting surface;

said piston assembly dimensioned to be mounted to the associated support member such that said piston chamber at least partially surrounds the associated support member on at least two sides thereof.

18. A piston assembly as set forth in claim 17, wherein said shell includes a generally cylindrical upper portion, and a generally toroidal lower portion.

19. A piston assembly as set forth in claim 18, wherein said recessed mounting surface is recessed into said toroidal lower portion of said piston chamber.

20. A piston assembly as set forth in claim 18, wherein said toroidal lower portion is configured to surround an end of said second mounting surface such that, when mounted to the associated support member, said piston chamber at least partially surrounds the associated support member on at least four sides thereof.

* * * * *